US012682808B2

(12) United States Patent
Jeon et al.

(10) Patent No.: US 12,682,808 B2
(45) Date of Patent: Jul. 14, 2026

(54) DISPLAY APPARATUS, METHOD OF DRIVING DISPLAY PANEL USING THE SAME AND ELECTRONIC APPARATUS INCLUDING THE SAME

(71) Applicant: Samsung Display Co., Ltd., Yongin-Si (KR)

(72) Inventors: Joonhyeok Jeon, Yongin-si (KR); Byoungkwan An, Yongin-si (KR); Jongman Kim, Yongin-si (KR); Kyoungho Lim, Yongin-si (KR); Seungho Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/216,834

(22) Filed: May 23, 2025

(65) Prior Publication Data

US 2026/0038410 A1 Feb. 5, 2026

(30) Foreign Application Priority Data

Aug. 2, 2024 (KR) ........................ 10-2024-0103265

(51) Int. Cl.
*G09G 3/20* (2006.01)

(52) U.S. Cl.
CPC ... *G09G 3/2007* (2013.01); *G09G 2320/0257* (2013.01); *G09G 2320/043* (2013.01); *G09G 2330/021* (2013.01)

(58) Field of Classification Search
CPC ......... G09G 3/2007; G09G 2320/0257; G09G 2320/043; G09G 2330/021
See application file for complete search history.

(56) References Cited

U.S. PATENT DOCUMENTS 6,546,126 B1 * 4/2003 Wittmann .......... H05K 13/0812 250/559.46
10,262,582 B2 4/2019 Han
10,943,541 B1 * 3/2021 Tan .......................... G09G 3/32
10,984,713 B1 * 4/2021 Tan ...................... G09G 3/3233
11,164,543 B1 * 11/2021 Gao ..................... G09G 3/2074
2003/0107769 A1 * 6/2003 Kang ................... H04N 1/4053 358/1.9

(Continued)

FOREIGN PATENT DOCUMENTS

KR 10-2425795 B1 7/2022

*Primary Examiner* — Benyam Ketema
(74) *Attorney, Agent, or Firm* — Innovation Counsel LLP

(57) ABSTRACT

A display apparatus includes a display panel and a display panel driver. The display panel driver determines whether a driving mode of the display panel is a low frequency driving mode, generates an age using a first grayscale acceleration coefficient if the driving mode of the display panel is not the low frequency driving mode, and generates the age using a second grayscale acceleration coefficient different from the first grayscale acceleration coefficient if the driving mode of the display panel is the low frequency driving mode. The first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

20 Claims, 11 Drawing Sheets

(56) References Cited

U.S. PATENT DOCUMENTS

| | | | | | |
|---|---|---|---|---|---|
| 2004/0174322 | A1* | 9/2004 | Kim | G09G 3/2059 | 345/204 |
| 2004/0213457 | A1* | 10/2004 | Mori | G06T 5/92 | 382/167 |
| 2005/0007392 | A1* | 1/2005 | Kasai | G09G 3/3275 | 345/690 |
| 2005/0088379 | A1* | 4/2005 | Tsuchida | G09G 3/3291 | 345/76 |
| 2007/0097462 | A1* | 5/2007 | Goma | H04N 1/6033 | 358/1.7 |
| 2007/0164946 | A1* | 7/2007 | Akutsu | G09G 3/36 | 345/87 |
| 2007/0222726 | A1* | 9/2007 | Chen | G09G 3/3611 | 345/87 |
| 2013/0135272 | A1* | 5/2013 | Park | G09G 3/3233 | 345/211 |
| 2014/0055500 | A1* | 2/2014 | Lai | G09G 3/006 | 345/77 |
| 2014/0292342 | A1* | 10/2014 | Chaji | G09G 3/32 | 324/414 |
| 2014/0306868 | A1* | 10/2014 | Chaji | G09G 3/32 | 345/77 |
| 2015/0103106 | A1* | 4/2015 | Chaji | G09G 3/3225 | 345/690 |
| 2016/0267838 | A1* | 9/2016 | Zhang | G09G 3/3225 | |
| 2016/0307498 | A1* | 10/2016 | Chaji | G09G 3/3291 | |
| 2019/0066575 | A1* | 2/2019 | Song | G09G 3/3208 | |
| 2019/0362671 | A1* | 11/2019 | Kuki | G09G 3/2007 | |
| 2020/0402446 | A1* | 12/2020 | Wang | G09G 3/3208 | |
| 2021/0225272 | A1* | 7/2021 | Yang | G09G 3/2092 | |
| 2021/0407435 | A1* | 12/2021 | Tang | H10K 59/13 | |
| 2022/0005419 | A1* | 1/2022 | Xie | G09G 3/3233 | |
| 2022/0076630 | A1* | 3/2022 | Pyun | G09G 3/3233 | |
| 2022/0139309 | A1* | 5/2022 | Ok | G09G 3/3208 | 345/214 |
| 2022/0366822 | A1* | 11/2022 | Leerentveld | G09G 3/3233 | |
| 2023/0030225 | A1* | 2/2023 | Lee | G09G 3/3258 | |
| 2023/0134326 | A1* | 5/2023 | Lee | G09G 3/3233 | 345/690 |
| 2023/0138436 | A1* | 5/2023 | Lee | G09G 3/32 | 345/55 |
| 2023/0298502 | A1* | 9/2023 | Lee | G09G 3/3233 | |
| 2024/0144860 | A1* | 5/2024 | Hong | G09G 3/3233 | |
| 2024/0290254 | A1* | 8/2024 | Feng | G09G 3/035 | |
| 2025/0391305 | A1* | 12/2025 | An | G09G 3/2007 | |
| 2026/0038410 | A1* | 2/2026 | Jeon | G09G 3/2007 | |

* cited by examiner

DISPLAY APPARATUS, METHOD OF DRIVING DISPLAY PANEL USING THE SAME AND ELECTRONIC APPARATUS INCLUDING THE SAME

CROSS-REFERENCE TO RELATED APPLICATION(S)

This application claims priority under 35 U.S.C. § 119 to Korean Patent Application No. 10-2024-0103265, filed on Aug. 2, 2024 in the Korean Intellectual Property Office KIPO, the contents of which are herein incorporated by reference in their entireties.

BACKGROUND

1. Field

Embodiments of the present inventive concept relate to a display apparatus, a method of driving a display panel using the display apparatus and an electronic apparatus including the display apparatus. More particularly, embodiments of the present inventive concept relate to a display apparatus having an enhanced display quality, a method of driving a display panel using the display apparatus and an electronic apparatus including the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls an operation of the gate driver and an operation of the data driver.

The display panel driver may accumulate age information related to a deterioration of a pixel to compensate for the deterioration. However, due to a limited storage of a memory which is used for the compensation for the pixel deterioration, an accuracy of the age information for a low grayscale value may be low, and overcompensation or undercompensation to the pixel deterioration may be occurred.

SUMMARY

Embodiments of the present inventive concept provide a display apparatus enhancing an accuracy of age information for a low grayscale value by utilizing a grayscale acceleration coefficient in which a low grayscale range is subdivided for a low frequency driving mode or a low grayscale image.

Embodiments of the present inventive concept also provide a method of driving a display panel using the display apparatus.

Embodiments of the present inventive concept also provide an electronic apparatus including the display apparatus.

According to an embodiment of the present inventive concept, a display apparatus includes a display panel including a plurality of pixels, a gate driver and a data driver, and a display panel driver connected to the gate driver and the data driver and providing a gate control signal to the gate driver and a data control signal to the data driver. The display panel driver determines whether a driving mode of the display panel is a low frequency driving mode, generates an age using a first grayscale acceleration coefficient if the driving mode of the display panel is not the low frequency driving mode, and generates the age using a second grayscale acceleration coefficient different from the first grayscale acceleration coefficient if the driving mode of the display panel is the low frequency driving mode. The first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

In an embodiment, the second grayscale acceleration coefficient may have more fragmented values for a low grayscale region than the first grayscale acceleration coefficient.

In an embodiment, the first grayscale acceleration coefficient may have a first inclination for grayscale values between 0 and the predetermined reference grayscale value. The second grayscale acceleration coefficient may have a second inclination greater than the first inclination for the grayscale values between 0 and the predetermined reference grayscale value.

In an embodiment, the first grayscale acceleration coefficient may be obtained by $$\text{round}\left(\left(\left(\frac{\text{grayscale value}}{\text{maximum grayscale value}}\right)^{gm}\right)^{lac}\times res\right).$$

The second grayscale acceleration coefficient may be obtained by $$\text{round}\left(\frac{\text{round}\left(\left(\left(\frac{\text{grayscale value}}{\text{maximum grayscale value}}\right)^{gm}\right)^{lac}\times res\times sf\right)}{sf}\right).$$

Herein, round is a function which rounds a value from a first decimal place, gm represents a gamma value, lac represents a luminance acceleration coefficient, res represents a resolution, and sf represents a scale factor.

In an embodiment, the display panel driver may use a temperature coefficient to generate the age. The temperature coefficient may be set to increase an age accumulation value as a temperature of the display panel increases.

In an embodiment, the display panel driver may use a position coefficient to generate the age. The position coefficient may be set to decrease an age accumulation value as a luminous efficiency of a pixel of the display panel increases.

In an embodiment, the display panel driver may use a frequency coefficient to generate the age. The frequency coefficient may be set to decrease an age accumulation value as a driving frequency of the display panel increases.

In an embodiment, the display panel driver may use a light emitting duty coefficient to generate the age. The light emitting duty coefficient may be set to increase an age accumulation value as a light emitting duty of the display panel increases.

In an embodiment, the display panel driver may include a low frequency mode determiner configured to determine whether the driving mode of the display panel is the low frequency driving mode and to output a first flag signal, a coefficient determiner configured to determine an acceleration coefficient based on the first flag signal, an accumulator configured to generate the age using an after-compensation image and the acceleration coefficient and to accumulate the age, and a compensator configured to compensate for a before-compensation image using an accumulated age to generate the after-compensation image.

In an embodiment, the display panel driver may further include a scaler configured to downscale a grayscale value of input image data to generate the before-compensation image.

In an embodiment, the display panel driver may further include a temperature measurer configured to output a temperature map according to positions in the display panel to the accumulator.

In an embodiment, the display panel driver may include a low frequency mode determiner configured to determine whether the driving mode of the display panel is the low frequency driving mode and to output a first flag signal, a coefficient determiner configured to determine an acceleration coefficient based on the first flag signal, an accumulator configured to generate the age using a before-compensation image and the acceleration coefficient and to accumulate the age, and a compensator configured to compensate for the before-compensation image using an accumulated age to generate an after-compensation image.

According to an embodiment of the present inventive concept, a display apparatus includes a display panel including a plurality of pixels, a gate driver and a data driver, and a display panel driver connected to the gate driver and the data driver and providing a first control signal to the gate driver and a second control signal to the data driver. The display panel driver determines whether input image data represents a low grayscale image, generates an age using a first grayscale acceleration coefficient if the input image data does not represent the low grayscale image, and generates the age using a second grayscale acceleration coefficient if the input image data represents the low grayscale image. When all of grayscale values of the input image data are equal to or less than a threshold grayscale value, the input image data is determined as the low grayscale image. The first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

In an embodiment, the display panel driver may include a low grayscale value determiner configured to determine whether the input image data represents the low grayscale image and to output a second flag signal, a coefficient determiner configured to determine an acceleration coefficient based on the second flag signal, an accumulator configured to generate the age using an after-compensation image and the acceleration coefficient and to accumulate the age, and a compensator configured to compensate a before-compensation image using an accumulated age to generate the after-compensation image.

In an embodiment, the display panel driver may include a low grayscale value determiner configured to determine whether the input image data represents the low grayscale image and to output a second flag signal, a coefficient determiner configured to determine an acceleration coefficient based on the second flag signal, an accumulator configured to generate the age using a before-compensation image and the acceleration coefficient and to accumulate the age, and a compensator configured to compensate the before-compensation image using an accumulated age to generate an after-compensation image.

In an embodiment, the first grayscale acceleration coefficient may have a first inclination for grayscale values between 0 and the predetermined reference grayscale value. The second grayscale acceleration coefficient may have a second inclination greater than the first inclination for the grayscale values between 0 and the predetermined reference grayscale value.

In an embodiment, the second grayscale acceleration coefficient may have more fragmented values for a low grayscale region than the first grayscale acceleration coefficient.

In an embodiment, the first grayscale acceleration coefficient may be obtained by $$\text{round}\left(\left(\left(\frac{\text{grayscale value}}{\text{maximum grayscale value}}\right)^{gm}\right)^{lac}\times res\right).$$

The second grayscale acceleration coefficient may be obtained by $$\text{round}\left(\left(\left(\frac{\text{grayscale value}}{\text{maximum grayscale value}}\right)^{gm}\right)^{lac}\times res\right).$$

Herein, round is a function which rounds a value from a first decimal place, gm represents a gamma value, lac represents a luminance acceleration coefficient, res represents a resolution, and sf represents a scale factor.

According to an embodiment of the present inventive concept, an electronic apparatus includes a display panel including a plurality of pixels, a gate driver and a data driver, a display panel driver connected to the gate driver and the data driver and providing a first control signal to the gate driver and a second control signal to the data driver, and a processor providing input image data and an input control signal to the display panel driver. The display panel driver determines whether a driving mode of the display panel is a low frequency driving mode, generates an age using a first grayscale acceleration coefficient if the driving mode of the display panel is not the low frequency driving mode, and generates the age using a second grayscale acceleration coefficient different from the first grayscale acceleration coefficient if the driving mode of the display panel is the low frequency driving mode. The first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

In an embodiment, the first grayscale acceleration coefficient may have a first inclination for grayscale values between 0 and the predetermined reference grayscale value. The second grayscale acceleration coefficient may have a second inclination greater than the first inclination for the grayscale values between 0 and the predetermined reference grayscale value.

According to the display apparatus, the method of driving the display panel using the display apparatus and the electronic apparatus including the display apparatus, an accuracy of the age information for the low grayscale value may be enhanced using the grayscale acceleration coefficient in which the low grayscale range is subdivided for the low frequency driving mode or the low grayscale image.

When the accuracy of the age information for the low grayscale value is enhanced, an accuracy of a deterioration compensation for the low grayscale value may be enhanced. As the accuracy of the deterioration compensation for the low grayscale value may increase, a display quality of the display panel may be enhanced.

BRIEF DESCRIPTION OF THE DRAWINGS

The above and other features and advantages of the present inventive concept will become more apparent from the following detailed description in conjunction with the accompanying drawings.

DETAILED DESCRIPTION OF THE INVENTIVE CONCEPT

Hereinafter, the present inventive concept will be explained in detail with reference to the accompanying drawings.

Figure 1:
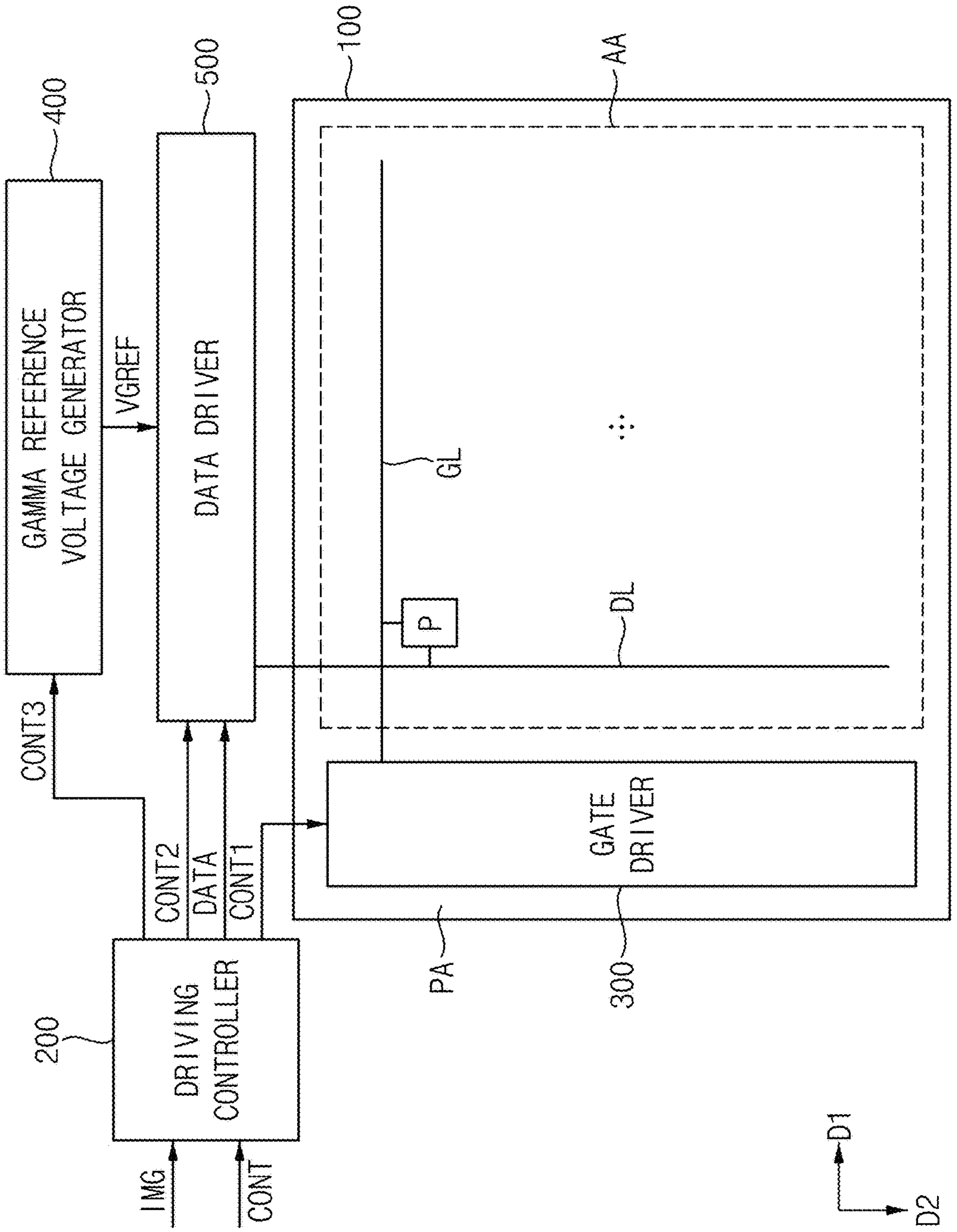
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver drives the display panel 100. The display panel driver includes a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400 and the data driver 500 may be integrally formed. A driving module in which at least the driving controller 200 and the data driver 500 are integrally formed may be referred to as a timing controller embedded data driver (TED).

The display panel 100 has a display region AA on which an image is displayed and a peripheral region PA adjacent to the display region AA.

The display panel 100 includes a plurality of gate lines GL, a plurality of data lines DL and a plurality of pixels P connected to the gate lines GL and the data lines DL. The gate lines GL may extend in a first direction D1, and the data lines DL may extend in a second direction D2 crossing the first direction D1.

The driving controller 200 may receive input image data IMG and an input control signal CONT from an external apparatus (e.g. an application processor). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals based on the first control signal CONT1 received from the driving controller 200. The gate driver 300 may output the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF based on the third control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 may receive the second control signal CONT2 and the data signal DATA from the driving controller 200, and receives the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

Figure 2:
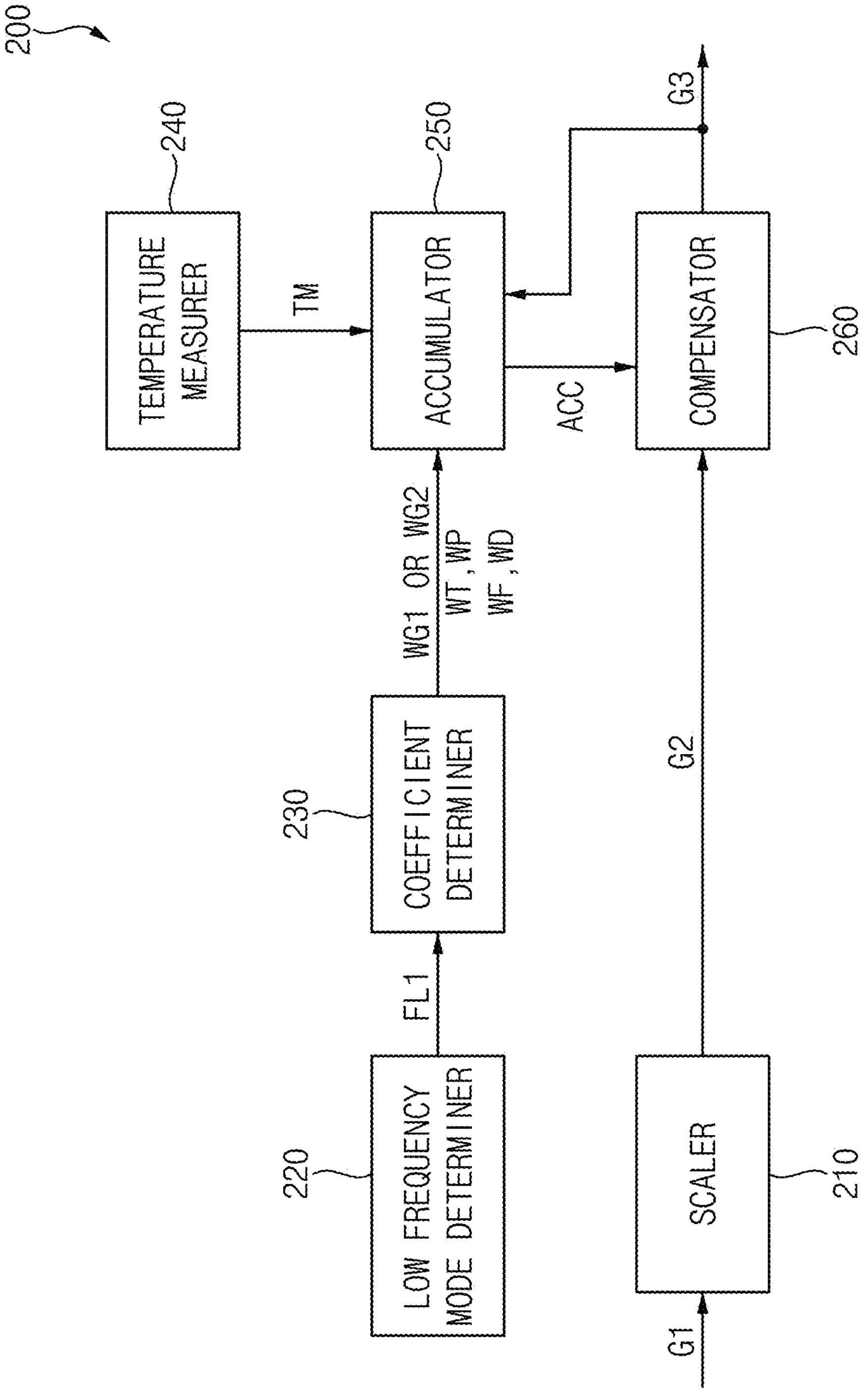
FIG. 2 is a block diagram illustrating a driving controller of FIG. 1.
Figure 3:
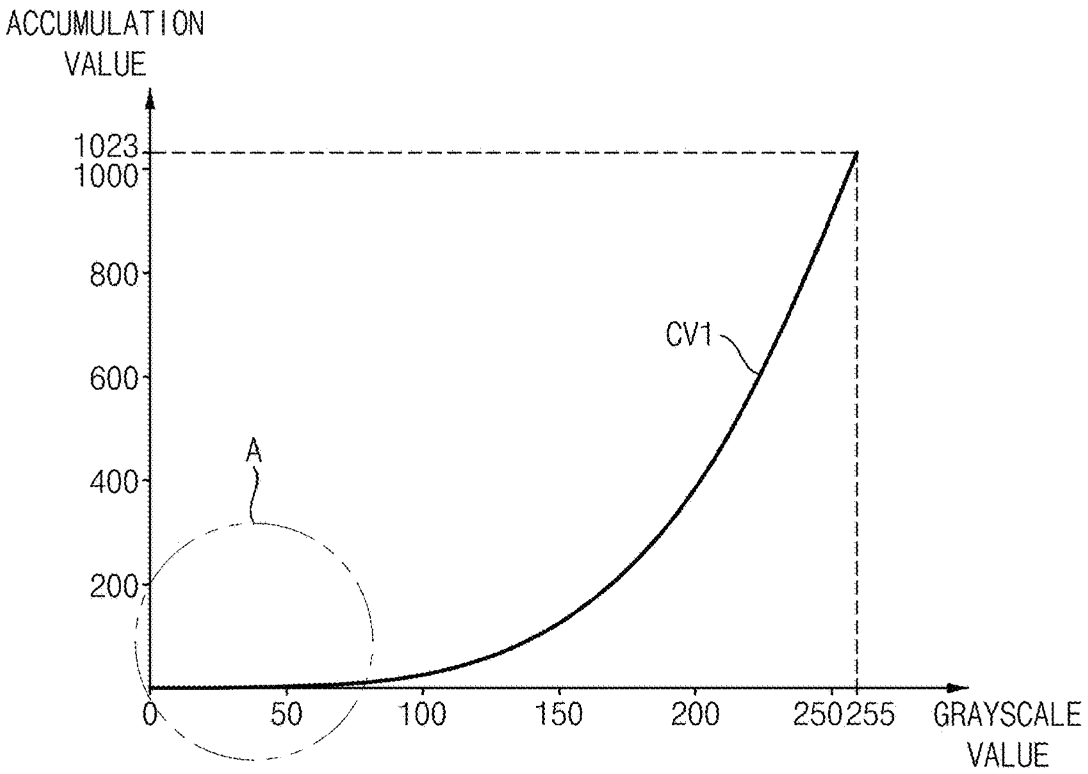
FIG. 3 is a graph illustrating a first grayscale acceleration coefficient of FIG. 2.
Figure 4:
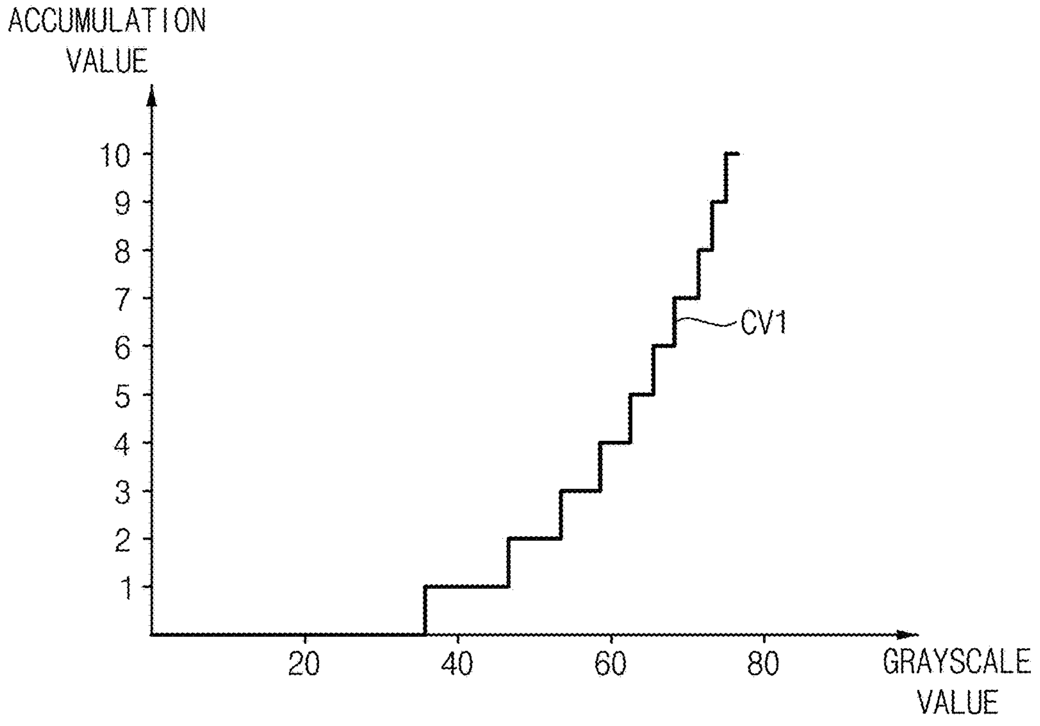
FIG. 4 is a graph illustrating the first grayscale acceleration coefficient of FIG. 2 for an area A of FIG. 3.
Figure 5:
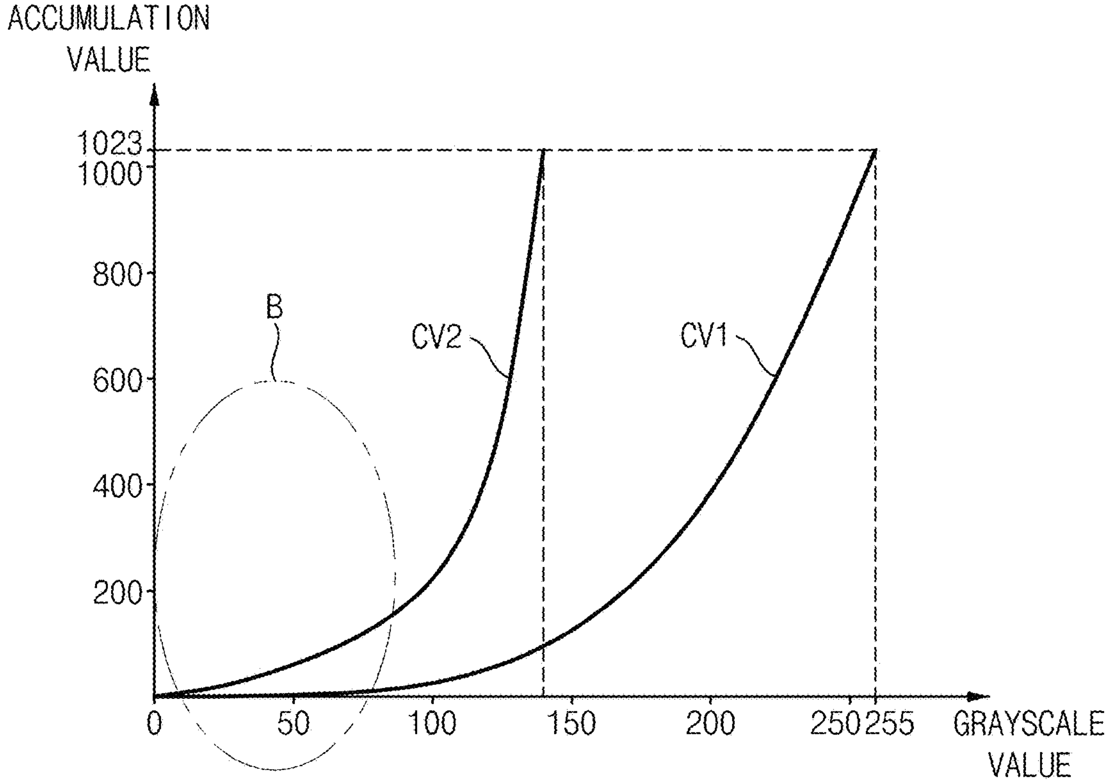
FIG. 5 is a graph illustrating the first grayscale acceleration coefficient and a second grayscale acceleration coefficient of FIG. 2.
Figure 6:
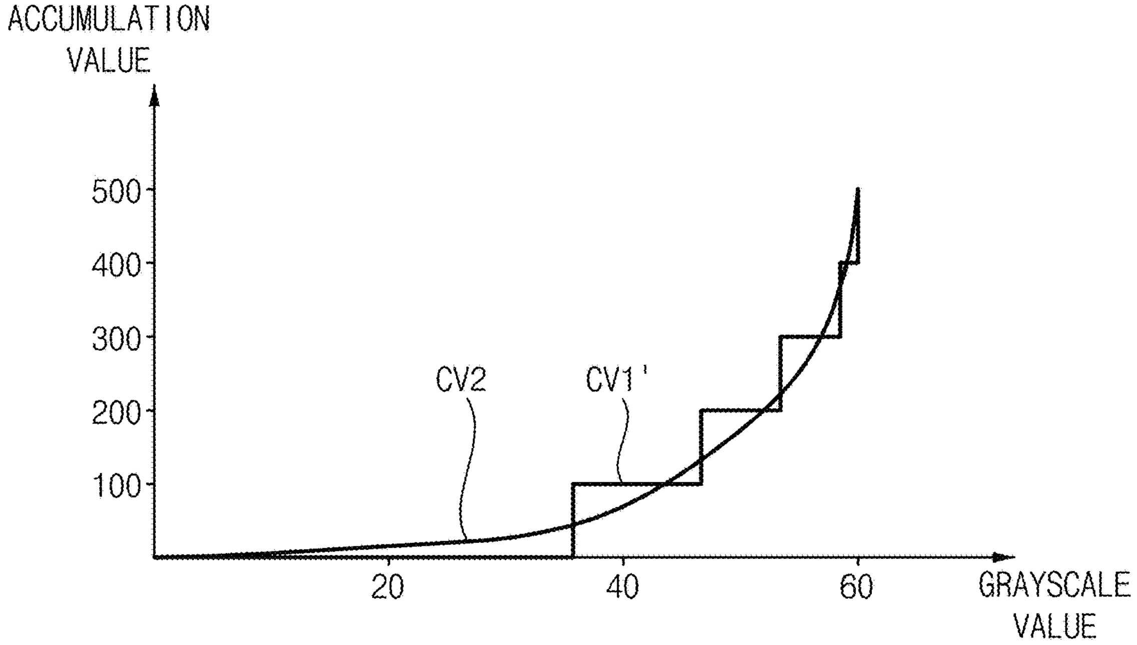
FIG. 6 is a graph illustrating the second grayscale acceleration coefficient of FIG. 2 for an area B of FIG. 5 according to an embodiment of the present inventive concept and a grayscale acceleration coefficient according to a comparative embodiment for the area B of FIG. 5.
Figure 7:
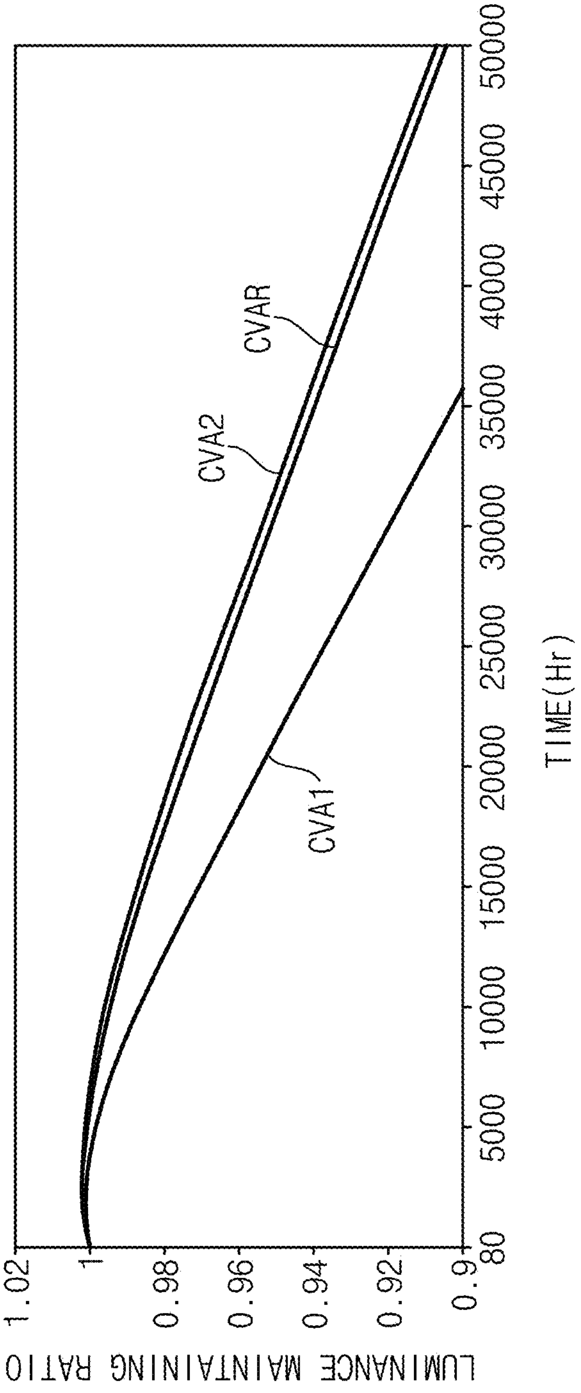
FIG. 7 is a graph illustrating a luminance maintaining ratio of the embodiment and a luminance maintaining ratio of the comparative embodiment.

FIG. 2 is a block diagram illustrating the driving controller 200 of FIG. 1. FIG. 3 is a graph illustrating a first grayscale acceleration coefficient of FIG. 2. FIG. 4 is a graph illustrating the first grayscale acceleration coefficient of FIG. 2 for an area A of FIG. 3. FIG. 5 is a graph illustrating the first grayscale acceleration coefficient and a second grayscale acceleration coefficient of FIG. 2. FIG. 6 is a graph illustrating the second grayscale acceleration coefficient of FIG. 2 for an area B of FIG. 5 according to an embodiment of the present inventive concept and a grayscale acceleration coefficient according to a comparative embodiment for the area B of FIG. 5. FIG. 7 is a graph illustrating a luminance maintaining ratio of the embodiment and a luminance maintaining ratio of the comparative embodiment.

Referring to FIGS. 1 to 7, the display panel driver (e.g. the driving controller 200) may determine whether a driving mode of the display panel 100 is a low frequency driving mode, may generate an age using a first grayscale acceleration coefficient WG1 if the driving mode of the display panel 100 is not the low frequency driving mode, and may generate the age using a second grayscale acceleration coefficient WG2 different from the first grayscale acceleration coefficient WG1 if the driving mode of the display panel 100 is the low frequency driving mode.

The first grayscale acceleration coefficient WG1 may represent a degree of accumulation of the age according to a grayscale value. Since a higher grayscale value may mean a higher degree of a pixel deterioration, a value of the first grayscale acceleration coefficient WG1 may increase, as the grayscale value increases. The first grayscale acceleration coefficient WG1 may be set to increase an accumulation value of the age as the grayscale value increases.

The second grayscale acceleration coefficient WG2 may represent a degree of accumulation of the age according to a grayscale value. As a higher grayscale value may mean a higher degree of a pixel deterioration, a value of the second grayscale acceleration coefficient WG2 may also increase, as the grayscale value increases. The second grayscale acceleration coefficient WG2 may be set to increase an accumulation value of the age as the grayscale value increases.

For example, in an embodiment of the present inventive concept, the grayscale value may be in a range between 0 and 255, the first grayscale acceleration coefficient WG1 and the second grayscale acceleration coefficient WG2 may range from 0 to 1023, respectively. The first grayscale acceleration coefficient WG1 and the second grayscale acceleration coefficient WG2 may be integers.

In FIGS. 3 to 5, the first grayscale acceleration coefficient WG1 is indicated as CV1 and in FIGS. 5 and 6, the second grayscale acceleration coefficient WG2 is indicated as CV2. CV1' in FIG. 6 may represent a value which is calculated by a simple multiplication of the first grayscale acceleration coefficient WG1 by a scale factor (e.g. 100 in FIG. 6).

As shown in FIG. 4, an age accumulation value of the first grayscale acceleration coefficient WG1 may be set to zero for grayscale values between 0 and 35. If a resolution of the first grayscale acceleration coefficient WG1 is sufficiently high, the age accumulation value in the low grayscale values may have a more detailed value. However, due to a limit of a memory, the age accumulation values of the first grayscale acceleration coefficient WG1 may be set to have a value ranging from 0 to 1023 for grayscale values between 0 and 255, and accordingly, the age accumulation value of the first grayscale acceleration coefficient WG1 may be set to zero for low grayscale values ranging from 0 to 35. However, actual age accumulation values may have specific real values between 0 and 0.5 for the grayscale values between 0 and 35.

The actual age accumulation values may be calculated using following Formula 1.

$$\left(\left(\frac{\text{grayscale value}}{\text{maximum grayscale value}}\right)^{gm}\right)^{lac}\times res \qquad \text{[Formula 1]}$$

Herein, gm represents a gamma value, lac represents a luminance acceleration coefficient and res represents a resolution.

Since the actual age accumulation value is determined as an integer to be stored in the memory, an integer value of the actual age accumulation value is obtained by rounding the actual age accumulation value from the first decimal place using following Formula 2. Herein, the integer value of the actual age accumulation value may be the first grayscale acceleration coefficient WG1.

$$\text{round}\left(\left(\left(\frac{\text{grayscale value}}{\text{maximum grayscale value}}\right)^{gm}\right)^{lac}\times res\right) \qquad \text{[Formula 2]}$$

Herein, round is a function which rounds a value from the first decimal place.

When the gamma value is 2.2, the luminance acceleration coefficient is 1.75 and the maximum grayscale value is 255, the actual age accumulation value may be 0.4378 for a grayscale value of 34. However, when the gamma value may be 2.2, the luminance acceleration coefficient may be 1.75 and the maximum grayscale value is 255, the integer value of the actual age accumulation value may be 0 for the grayscale value of 34.

When the gamma value is 2.2, the luminance acceleration coefficient is 1.75 and the maximum grayscale value is 255, the actual age accumulation value may be 0.4895 for a grayscale value of 35. However, when the gamma value may be 2.2, the luminance acceleration coefficient may be 1.75 and the maximum grayscale value is 255, the integer value of the actual age accumulation value may be 0 for the grayscale value of 35.

When the gamma value is 2.2, the luminance acceleration coefficient is 1.75 and the maximum grayscale value is 255, the actual age accumulation value may be 0.5456 for a grayscale value of 36. However, when the gamma value may be 2.2, the luminance acceleration coefficient may be 1.75 and the maximum grayscale value is 255, the integer value of the actual age accumulation value may be 1 for the grayscale value of 36.

When the age is accumulated using the first grayscale acceleration coefficient WG1, the age accumulation value for the grayscale value of 35 may not be 0.4895 but 0, and the age accumulation value for the grayscale value of 36 may not be 0.5456 but 1.

For the grayscale value of 35, much less age (e.g. 0) may be accumulated compared to the actual age accumulation value (0.4895). Thus, when the display panel 100 displays the grayscale value of 35 for a long time, the deterioration compensation of the display panel 100 may be undercompensated.

In contrast, for the grayscale value of 36, much more age (e.g. 1) may be accumulated compared to the actual age accumulation value (0.5456). Thus, when the display panel 100 displays the grayscale value of 36 for a long time, the deterioration compensation of the display panel 100 may be overcompensated.

When the driving mode of the display panel 100 is the low frequency driving mode, the grayscale value or the luminance of the display image of the display panel 100 may be limited to a specific grayscale value or a specific luminance to reduce a power consumption.

For example, when the driving mode of the display panel 100 is an always on mode (AOD mode), the grayscale value or the luminance of the display image of the display panel 100 may be limited to a specific grayscale value or a specific luminance.

Thus, when the driving mode of the display panel 100 is the low frequency driving mode (e.g. the AOD mode), the driving controller 200 may generate the age using the second grayscale acceleration coefficient WG2 different from the first grayscale acceleration coefficient WG1.

Since the age accumulation value in the memory may be determined as an integer, the second grayscale acceleration coefficient WG2 may be calculated by multiplying the age accumulation value by a scale factor, operating rounding from the first decimal place and then dividing by the scale factor again.

The second grayscale acceleration coefficient WG2 may be calculated using following Formula 3.

$$\text{round}\left(\frac{\text{round}\left(\left(\left(\frac{\text{grayscale value}}{\text{maximum grayscale value}}\right)^{gm}\right) lac \times res \times sf\right)}{sf}\right) \quad \text{[Formula 3]}$$

Herein, sf may represent the scale factor.

When the gamma value is 2.2, the luminance acceleration coefficient is 1.75 and the maximum grayscale value is 255, the actual age accumulation value may be 0.4378 for a grayscale value of 34, and the integer value of the actual age accumulation value, e.g., the first grayscale acceleration coefficient WG1, may be 0 for the grayscale value of 34. In addition, the value by simply multiplying the first grayscale acceleration coefficient WG1 by the scale factor of 100 may still be 0 (see CV1' of FIG. 6). When the gamma value is 2.2, the luminance acceleration coefficient is 1.75, the maximum grayscale value is 255 and the scale factor is 100, the second grayscale acceleration coefficient WG2 may be 44 which is determined by rounding 43.78 from the first decimal place for the grayscale value of 34. As explained above, by using the second grayscale acceleration coefficient WG2 instead of the first grayscale acceleration coefficient WG1 for the low grayscale range, the accuracy of the accumulated age may be greatly enhanced.

When the gamma value is 2.2, the luminance acceleration coefficient is 1.75 and the maximum grayscale value is 255, the actual age accumulation value may be 0.4895 for a grayscale value of 35, and the integer value of the actual age accumulation value, e.g., the first grayscale acceleration coefficient WG1, may be 0 for the grayscale value of 35. In addition, the value by simply multiplying the first grayscale acceleration coefficient WG1 by the scale factor of 100 may still be 0 (see CV1' of FIG. 6). When the gamma value is 2.2, the luminance acceleration coefficient is 1.75, the maximum grayscale value is 255 and the scale factor is 100, the second grayscale acceleration coefficient WG2 may be 49 which is determined by rounding 48.95 from the first decimal place for the grayscale value of 35. As explained above, by using the second grayscale acceleration coefficient WG2 instead of the first grayscale acceleration coefficient WG1, the accuracy of the accumulated age may be greatly enhanced.

When the gamma value is 2.2, the luminance acceleration coefficient is 1.75 and the maximum grayscale value is 255, the actual age accumulation value may be 0.5456 for a grayscale value of 36, and the integer value of the actual age accumulation value, e.g., the first grayscale acceleration coefficient WG1, may be 1 for the grayscale value of 36. In addition, the value of simply multiplying the first grayscale acceleration coefficient WG1 by the scale factor of 100 may be 100 (see CV1' of FIG. 6). When the gamma value is 2.2, the luminance acceleration coefficient is 1.75, the maximum grayscale value is 255 and the scale factor is 100, the second grayscale acceleration coefficient WG2 may be 55 which is determined by rounding 54.56 from the first decimal place for the grayscale value of 36. As explained above, by using the second grayscale acceleration coefficient WG2 instead of the first grayscale acceleration coefficient WG1, the accuracy of the accumulated age may be greatly enhanced.

As shown in FIG. 5, the first grayscale acceleration coefficient WG1, to represent the grayscale values between 0 to 255, has values (CV1) ranging from 0 to 1023, and the second grayscale acceleration coefficient WG2, to represent the grayscale values between 0 and a predetermined reference grayscale value (e.g. about 140 in FIG. 5), has values (CV2) ranging from 0 to 1023.

The second grayscale acceleration coefficient WG2 may have more fragmented values for the low grayscale region than the first grayscale acceleration coefficient WG1.

The second grayscale acceleration coefficient WG2 may have a maximum value (e.g. 1023 in FIG. 5) for grayscale values equal to or greater than the predetermined reference grayscale value (e.g. about 140 in FIG. 5). In other words, while the first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

The first grayscale acceleration coefficient WG1 may have a first inclination for the grayscale values between 0 and the predetermined reference grayscale value (e.g. about 140 in FIG. 5), and the second grayscale acceleration coefficient WG2 may have a second inclination greater than the first inclination for the grayscale values between 0 and the predetermined reference grayscale value (e.g. about 140 in FIG. 5).

As shown in FIG. 7, when the display panel 100 continues to display the grayscale value of 36, a predicted luminance maintaining ratio using the first grayscale acceleration coefficient WG1 is indicated as CVA1, a predicted luminance maintaining ratio using the second grayscale acceleration coefficient WG2 is indicated as CVA2 and an actual luminance maintaining ratio is indicated as CVAR.

As shown in FIG. 7, the predicted luminance maintaining ratio using the first grayscale acceleration coefficient WG1 may have low accuracy, while the predicted luminance maintaining ratio using the second grayscale acceleration coefficient WG2 may have very similar accuracy to the actual luminance maintaining ratio.

Referring again to FIG. 2, the display panel driver (e.g. the driving controller 200) may include a low frequency mode determiner 220 determining whether the driving mode of the display panel 100 is the low frequency driving mode and outputting a first flag signal FL1, a coefficient determiner 230 determining an acceleration coefficient based on the first flag signal FL1, an accumulator 250 generating the age using an after-compensation image G3 and the acceleration coefficient WG1 or WG2 and accumulating the age, and a compensator 260 compensating a before-compensation image G2 using an accumulated age ACC to generate the after-compensation image G3.

The display panel driver (e.g. the driving controller 200) may further include a scaler 210 downscaling a grayscale value G1 of the input image data IMG to generate the before-compensation image G2.

The display panel driver (e.g. the driving controller 200) may further include a temperature measurer 240 outputting a temperature map TM according to positions in the display panel 100 to the accumulator 250.

The display panel driver (e.g. the driving controller 200) may further use a temperature coefficient WT to generate the age. Since the temperature coefficient WT may be set to increase the age accumulation value as the temperature of the display panel 100 increases, the deterioration of the display panel 100 may be accelerated as the temperature of the display panel 100 increases.

The display panel driver (e.g. the driving controller 200) may further use a position coefficient WP to generate the age. The position coefficient WP may be set to decrease the age accumulation value as a luminous efficiency of the pixel of the display panel 100 increases. The position coefficient WP may compensate for process variations of the pixel. As the luminous efficiency of the pixel of the display panel 100 decreases, a degree of the deterioration of the pixel may increase.

The display panel driver (e.g. the driving controller 200) may further use a frequency coefficient WF to generate the age. The frequency coefficient WF may be set to decrease the age accumulation value as a driving frequency of the display panel 100 increases. While the age may be accumulated on a frame basis, the display panel 100 may be actually degraded over continuous time. Accordingly, as the number of accumulated frames increases when the driving frequency is high, the age accumulation may be set to decrease when the driving frequency is high to slow the deterioration of the display panel.

The display panel driver (e.g. the driving controller 200) may further use a light emitting duty coefficient WD to generate the age. The light emitting duty coefficient WD may be set to increase the age accumulation value as a light emitting duty of the display panel 100 increases.

According to an embodiment, the accuracy of the age information for the low grayscale value may be enhanced by utilizing the grayscale acceleration coefficient in which the low grayscale range is subdivided for the low frequency driving mode or the low grayscale image.

When the accuracy of the age information for the low grayscale value is enhanced, an accuracy of a deterioration compensation for the low grayscale value may be enhanced. As the accuracy of the deterioration compensation for the low grayscale value increases, a display quality of the display panel 100 may be enhanced.

Figure 8:
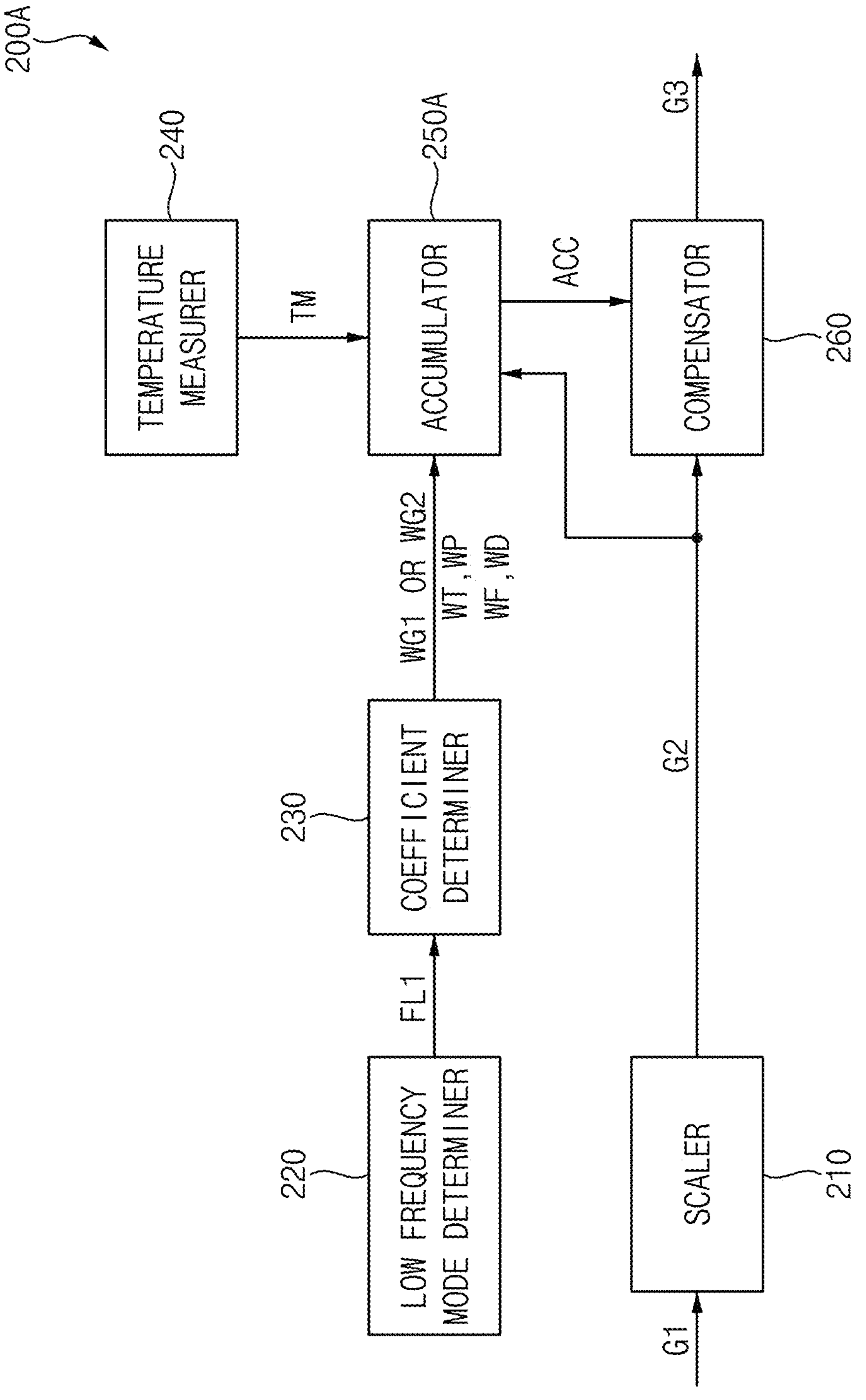
FIG. 8 is a block diagram illustrating a driving controller of a display apparatus according to an embodiment of the present inventive concept.

FIG. 8 is a block diagram illustrating a driving controller 200A of a display apparatus according to an embodiment of the present inventive concept.

The display apparatus according to an embodiment are substantially the same as the display apparatus of the embodiment explained above with reference to FIGS. 1 to 7 except for the structure of the driving controller. Thus, the same reference numerals will be used to refer to the same or like parts as those described in the embodiment of FIGS. 1 to 7 and any repetitive explanation concerning the above elements will be omitted.

Referring to FIGS. 1 and 3 to 8, the accumulator 250A may not accumulate the after-compensation image G3 but the before-compensation image G2.

The display panel driver (e.g. the driving controller 200A) may include a low frequency mode determiner 220 determining whether the driving mode of the display panel 100 is the low frequency driving mode and outputting a first flag signal FL1, a coefficient determiner 230 determining an acceleration coefficient based on the first flag signal FL1, an accumulator 250A generating the age using the before-compensation image G2 and the acceleration coefficient and accumulating the age, and a compensator 260 compensating for the before-compensation image G2 using an accumulated age ACC to generate the after-compensation image G3.

According to an embodiment, the accuracy of the age information for the low grayscale value may be enhanced by utilizing the grayscale acceleration coefficient in which the low grayscale range is subdivided for the low frequency driving mode or the low grayscale image.

When the accuracy of the age information for the low grayscale value is enhanced, an accuracy of a deterioration compensation for the low grayscale value may be enhanced. As the accuracy of the deterioration compensation for the low grayscale value increases, a display quality of the display panel 100 may be enhanced.

Figure 9:
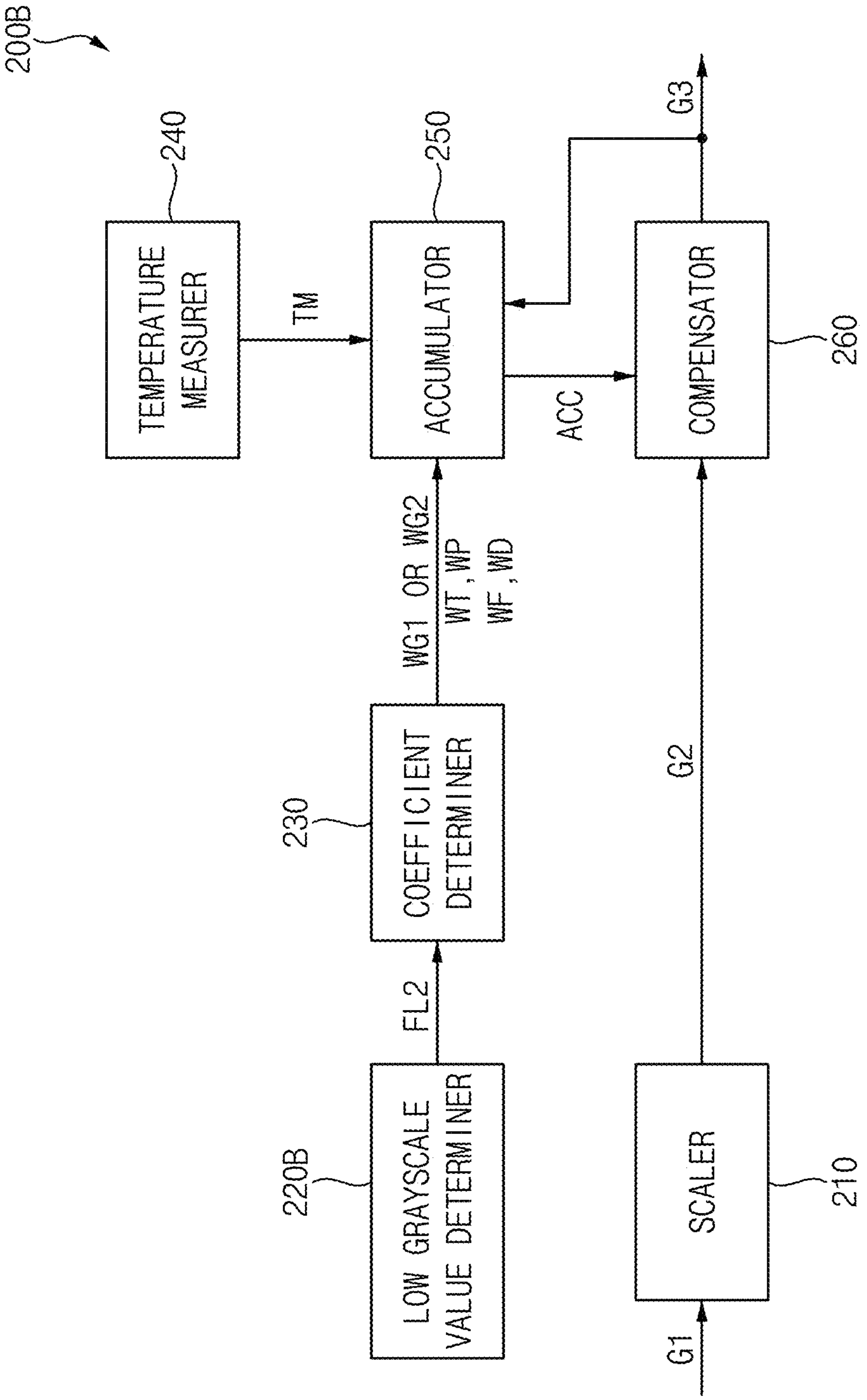
FIG. 9 is a block diagram illustrating a driving controller of a display apparatus according to an embodiment of the present inventive concept.

FIG. 9 is a block diagram illustrating a driving controller 200B of a display apparatus according to an embodiment of the present inventive concept.

The display apparatus according to an embodiment are substantially the same as the display apparatus of the embodiment explained above with reference to FIGS. 1 to 7 except for the structure of the driving controller. Thus, the same reference numerals will be used to refer to the same or like parts as those described in the embodiment of FIGS. 1 to 7 and any repetitive explanation concerning the above elements will be omitted.

Referring to FIGS. 1, 3 to 7 and 9, the display panel driver (e.g. the driving controller 200B) may determine whether input image data IMG represents a low grayscale image, to generate the age using the first grayscale acceleration coefficient WG1 if the input image data IMG does not represent the low grayscale image, and to generate the age using the second grayscale acceleration coefficient WG2 if the input image data IMG represents the low grayscale image. When all of grayscale values of the input image data IMG are equal to or less than a threshold grayscale value, the display panel driver may determine that the input image data IMG represents the low grayscale image.

The display panel driver (e.g. the driving controller 200B) may include a low grayscale value determiner 220B determining whether the input image data IMG represents the low grayscale image and outputting a second flag signal FL2, a coefficient determiner 230 determining an acceleration coefficient based on the second flag signal FL2, an accumulator 250 generating the age using an after-compensation image G3 and the acceleration coefficient and accumulating the age, and a compensator 260 compensating for a before-compensation image G2 using an accumulated age ACC to generate the after-compensation image G3.

According to an embodiment, the accuracy of the age information for the low grayscale value may be enhanced by utilizing the grayscale acceleration coefficient in which the low grayscale range is subdivided for the low frequency driving mode or the low grayscale image.

When the accuracy of the age information for the low grayscale value is enhanced, an accuracy of a deterioration compensation for the low grayscale value may be enhanced. As the accuracy of the deterioration compensation for the low grayscale value increases, a display quality of the display panel 100 may be enhanced.

Figure 10:
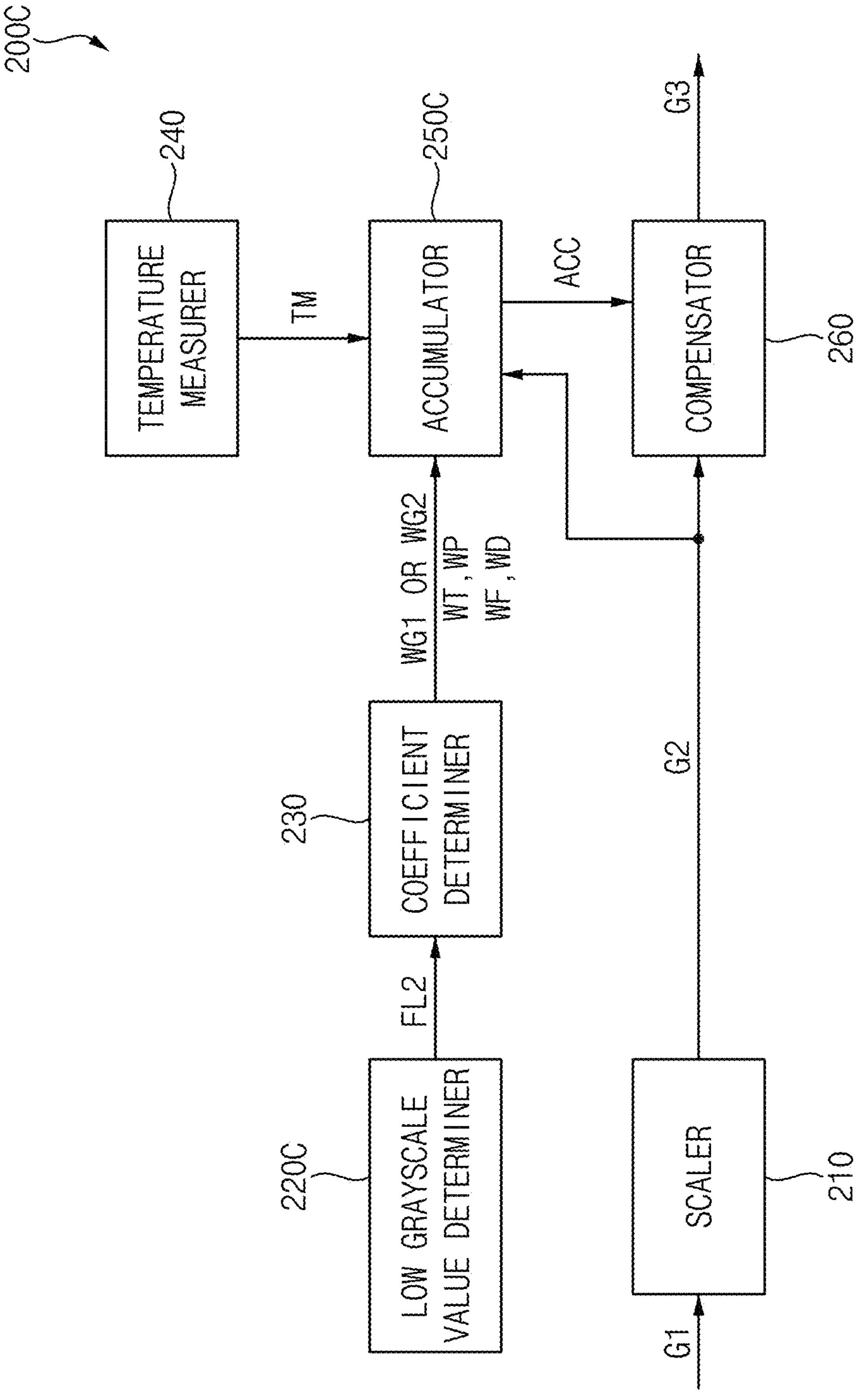
FIG. 10 is a block diagram illustrating a driving controller of a display apparatus according to an embodiment of the present inventive concept.

FIG. 10 is a block diagram illustrating a driving controller 200C of a display apparatus according to an embodiment of the present inventive concept.

The display apparatus according to an embodiment are substantially the same as the display apparatus of the embodiment explained above with reference to FIGS. 1 to 7 except for the structure of the driving controller. Thus, the same reference numerals will be used to refer to the same or like parts as those described in the embodiment of FIGS. 1 to 7 and any repetitive explanation concerning the above elements will be omitted.

Referring to FIGS. 1, 3 to 7 and 10, the display panel driver (e.g. the driving controller 200C) may determine whether input image data IMG represents a low grayscale image, to generate the age using the first grayscale acceleration coefficient WG1 if the input image data IMG does not represent the low grayscale image, and to generate the age using the second grayscale acceleration coefficient WG2 if the input image data IMG represents the low grayscale image. When all of grayscale values of the input image data IMG are equal to or less than a threshold grayscale value, the display panel driver may determine that the input image data IMG represents the low grayscale image.

The accumulator 250C may not accumulate the after-compensation image G3 but the before-compensation image G2.

The display panel driver (e.g. the driving controller 200C) may include a low grayscale value determiner 220C determining whether the input image data IMG represents the low grayscale image and outputting a second flag signal FL2, a coefficient determiner 230 determining an acceleration coefficient based on the second flag signal FL2, an accumulator 250C generating the age using the before-compensation image G2 and the acceleration coefficient and accumulating the age, and a compensator 260 compensating for the before-compensation image G2 using an accumulated age ACC to generate the after-compensation image G3.

According to an embodiment, the accuracy of the age information for the low grayscale value may be enhanced using the grayscale acceleration coefficient in which the low grayscale range is subdivided for the low frequency driving mode or the low grayscale image.

When the accuracy of the age information for the low grayscale value is enhanced, an accuracy of a deterioration compensation for the low grayscale value may be enhanced. As the accuracy of the deterioration compensation for the low grayscale value increase, a display quality of the display panel 100 may be enhanced.

Figure 11:
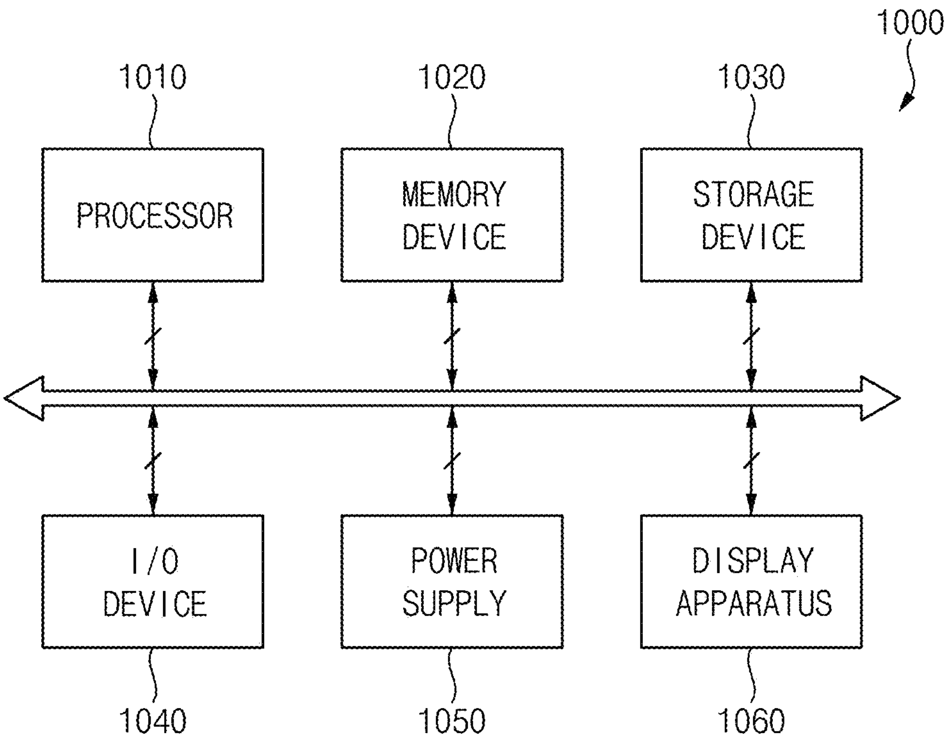
FIG. 11 is a block diagram illustrating an electronic apparatus according to an embodiment of the present inventive concept.
Figure 12:
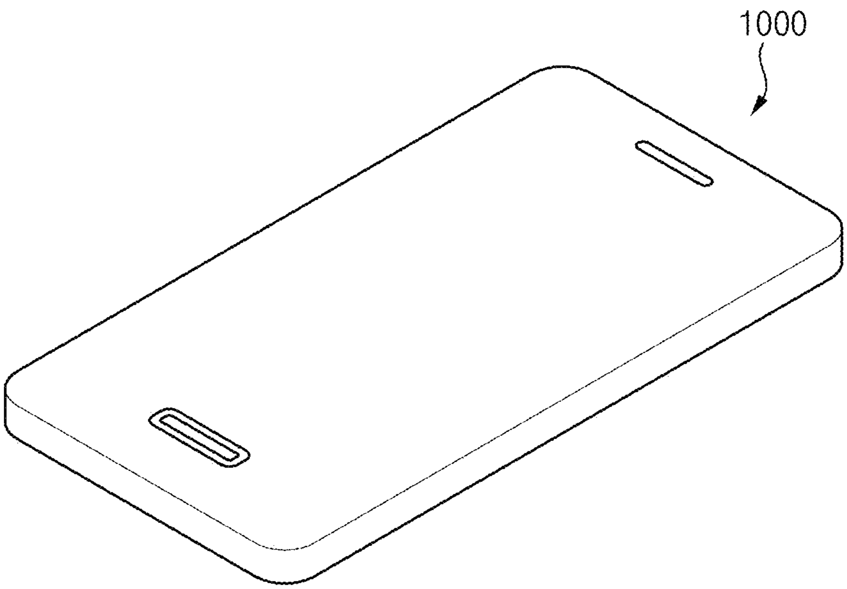
FIG. 12 is a diagram illustrating an example in which the electronic apparatus of FIG. 11 is implemented as a smartphone.
Figure 13:
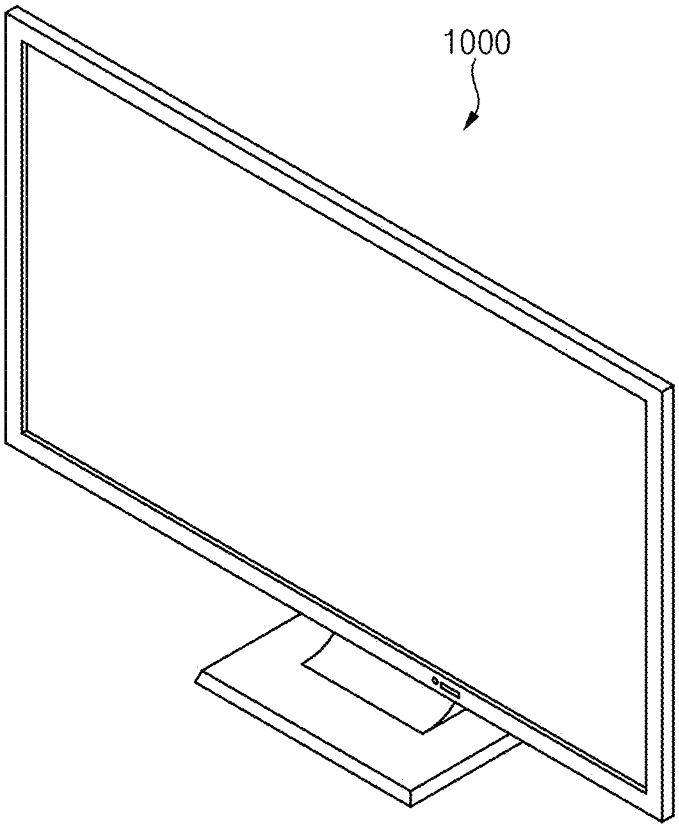
FIG. 13 is a diagram illustrating an example in which the electronic apparatus of FIG. 11 is implemented as a monitor or a television.

FIG. 11 is a block diagram illustrating an electronic apparatus 1000 according to an embodiment of the present inventive concept. FIG. 12 is a diagram illustrating an example in which the electronic apparatus 1000 of FIG. 11 is implemented as a smartphone. FIG. 13 is a diagram illustrating an example in which the electronic apparatus 1000 of FIG. 11 is implemented as a monitor or a television.

Referring to FIGS. 11 to 13, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus illustrated in FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 12, the electronic apparatus 1000 may be implemented as a smartphone. In an embodiment, as illustrated in FIG. 13, the electronic apparatus 1000 may be implemented as a monitor or a television. However, the electronic apparatus 1000 of the present inventive concept is not limited thereto. For example, the electronic apparatus 1000 may be implemented as a cellular phone, a video phone, a smart pad, a smart watch, a tablet PC, a car navigation system, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for the operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like, and an output device such as a printer, a speaker, or the like. The display apparatus 1060 may be included in the I/O device 1040. The power supply 1050 may provide power for operations of the electronic apparatus 1000. The display apparatus 1060 may be coupled to other components via the buses or other communication links.

Figure 14:
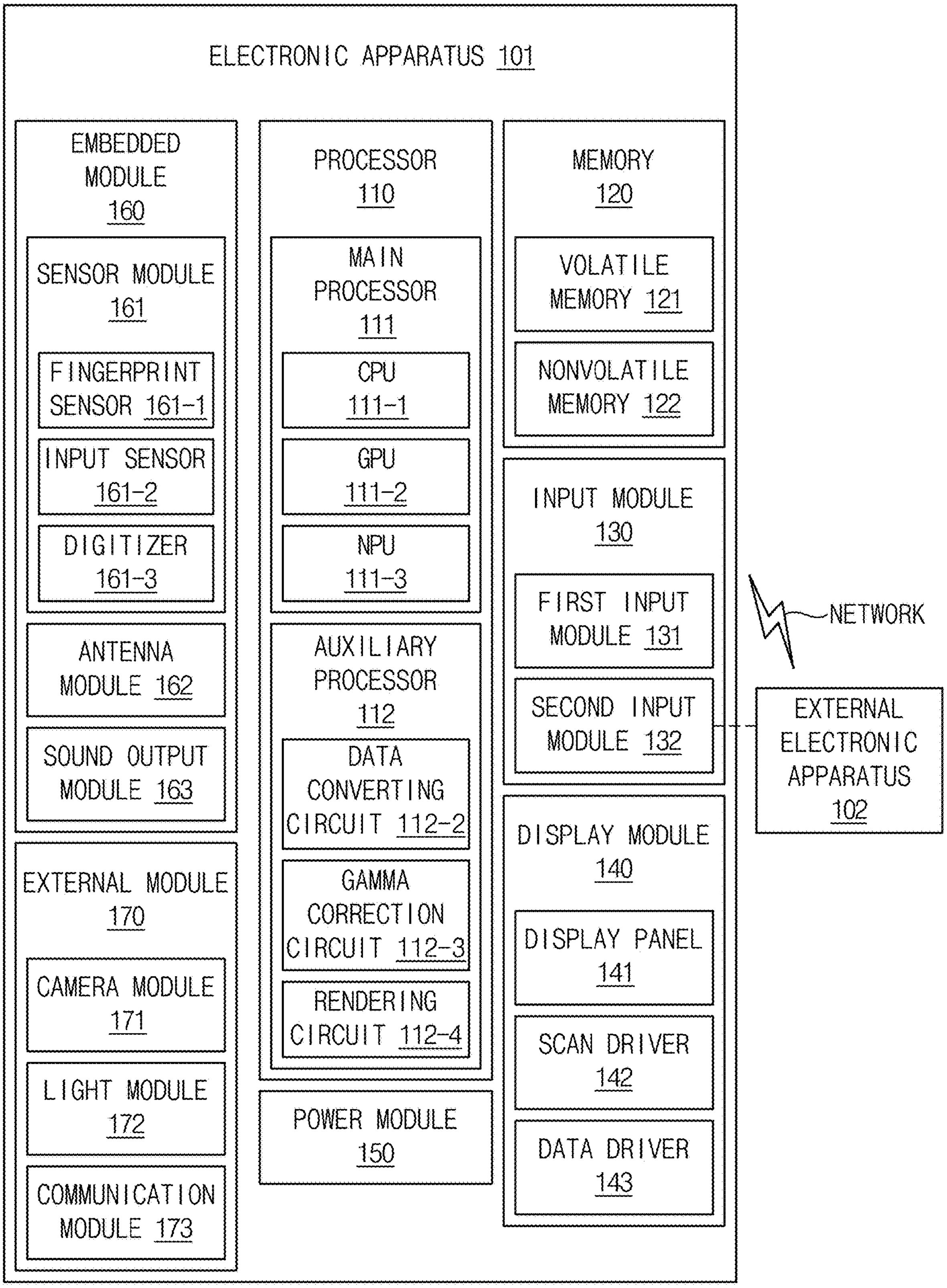
FIG. 14 is a block diagram illustrating an electronic apparatus according to an embodiment of the present inventive concept.

FIG. 14 is a block diagram illustrating an electronic apparatus 101 according to an embodiment of the present inventive concept.

Referring to FIGS. 1 to 14, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains the fingerprint information of the user as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input through the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g. a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic apparatus 101 connected to the processor 110 and to perform various data processing or operations. According to an embodiment, as at least part of the data processing or the operations, the processor 110 may store the received instructions or data from other elements (e.g. the input module 130, the sensor module 161 or a communication module 173) in a volatile memory 121, may process the instructions or data stored in the volatile memory 121, and may store the result of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network of the present inventive concept is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g. the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g. the processor 110 or the sensor module 161) of the electronic apparatus 101, as well as input or output data related to corresponding commands. The memory 120 may include at least one of the volatile memory 121 and the nonvolatile memory 122.

The input module 130 may receive commands or data, which is used in the elements (e.g. the processor 110, the sensor module 161 or the sound output module 163) of the electronic apparatus 101 from the outside of the electronic apparatus 101 (e.g. the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a key-board, a key (e.g. a button) or a pen (e.g. a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g. a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. However, the type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. However, the present inventive concept is not limited thereto. For example, the scan driver 142 may be integrated on the display panel 141. For example, the scan driver 142 may include an amorphous silicon TFT gate driver circuit (ASG) integrated on the display panel 141, a low temperature polycrystalline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. However, the present inventive concept is not limited thereto. For example, the light emission driver and the scan driver 142 may be integrally formed.

The data driver 143 receives a control signal from the controller and converts the image data into an analog voltage (e.g. the data voltage) and output the data voltages to the display panel 141 in response to the control signal.

The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmis-sion/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corre-sponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corre-sponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as a blood pressure, a moisture, or a body fat. For example, when a user touches a part of his body to a sensor layer or a sensing panel and does not move for a certain period of time, the input sensor 161-2 may detect the biosignal based on a change in an electric field caused by the part of the body so that the display module 140 may output user's desired information.

The digitizer 161-3 may generate a data value correspond-ing to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel as described above.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g. light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g. the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support the establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140. In addition, the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode to reduce a power consumption of the electronic apparatus 101.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the input data sensed by the input sensor 161-2 or the digitizer 161-3. When the sensor module 161 includes a temperature sensor, the processor 110 may receive temperature data corresponding to the temperature measured from the sensor module 161 and may further perform luminance correction on the image data based on the temperature data.

The processor 110 may receive the determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 on the display module 140.

Some of the above elements may be connected to each other through a communication method between peripheral devices such as a bus, a general purpose input/output (GPIO), a serial peripheral interface (SPI), a mobile industry processor interface (MIPI), or a ultra path interconnect (UPI) link to exchange signals (e.g. commands or data) with each other. The processor 110 may communicate with the display module 140 through an agreed interface. For example, the processor 110 may communicate with the display module 140 through any one of the above communication methods. However, the communication methods according to the present inventive concept may not be limited to the examples described above.

The electronic apparatus 101 according to various embodiments disclosed in the disclosure may be various types of apparatuses. For example, the electronic apparatus 101 may include at least one of a portable communication apparatus (e.g. a smart phone), a computer apparatus, a portable multimedia apparatus, a portable medical apparatus, a camera, a wearable device or a home appliance. However, the electronic apparatus 101 according to the embodiment of the disclosure may not be limited to the aforementioned exemplified apparatuses.

For example, the display panel 100 of FIG. 1 may correspond to the display panel 141 of FIG. 14. For example, the driving controller 200 of FIG. 1 may correspond to the controller of the auxiliary processor 112 of FIG. 14. For example, the gate driver 300 of FIG. 1 may correspond to the scan driver 142 of FIG. 14. For example, the data driver 500 of FIG. 1 may correspond to the data driver 143 of FIG. 14.

According to the embodiments of the display apparatus, the method of driving the display panel using the display apparatus and the electronic apparatus including the display apparatus, the accuracy of the deterioration compensation for the low grayscale value may be enhanced so that a display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel including a plurality of pixels, a gate driver and a data driver; and a display panel driver connected to the gate driver and the data driver, the display panel driver providing a gate control signal to the gate driver and a data control signal to the data driver, wherein the display panel driver determines whether a driving mode of the display panel is a low frequency driving mode, generates an age using a first grayscale acceleration coefficient if the driving mode of the display panel is not the low frequency driving mode, and generates the age using a second grayscale acceleration coefficient different from the first grayscale acceleration coefficient if the driving mode of the display panel is the low frequency driving mode, and wherein the first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

2. The display apparatus of claim 1, wherein the second grayscale acceleration coefficient has more fragmented values for a low grayscale region than the first grayscale acceleration coefficient.

3. The display apparatus of claim 1, wherein the first grayscale acceleration coefficient has a first inclination for grayscale values between 0 and the predetermined reference grayscale value, and wherein the second grayscale acceleration coefficient has a second inclination greater than the first inclination for the grayscale values between 0 and the predetermined reference grayscale value.

4. The display apparatus of claim 2, wherein the first grayscale acceleration coefficient is obtained by $$\text{round}\left(\left(\left(\frac{\text{grayscale value}}{\text{maximum grayscale value}}\right)^{gm}\right)^{lac}\times res\right),$$

and wherein the second grayscale acceleration coefficient is obtained by $$\text{round}\left(\frac{\text{round}\left(\left(\left(\frac{\text{grayscale value}}{\text{maximum grayscale value}}\right)^{gm}\right)^{lac}\times res\times sf\right)}{sf}\right),$$

where round is a function which rounds a value from a first decimal place, gm represents a gamma value, lac represents a luminance acceleration coefficient, res represents a resolution, and sf represents a scale factor.

5. The display apparatus of claim 1, wherein the display panel driver uses a temperature coefficient to generate the age, and wherein the temperature coefficient is set to increase an age accumulation value as a temperature of the display panel increases.

6. The display apparatus of claim 1, wherein the display panel driver uses a position coefficient to generate the age, and wherein the position coefficient is set to decrease an age accumulation value as a luminous efficiency of a pixel of the display panel increases.

7. The display apparatus of claim 1, wherein the display panel driver uses a frequency coefficient to generate the age, and wherein the frequency coefficient is set to decrease an age accumulation value as a driving frequency of the display panel increases.

8. The display apparatus of claim 1, wherein the display panel driver uses a light emitting duty coefficient to generate the age, and wherein the light emitting duty coefficient is set to increase an age accumulation value as a light emitting duty of the display panel increases.

9. The display apparatus of claim 1, wherein the display panel driver comprises:

a low frequency mode determiner configured to determine whether the driving mode of the display panel is the low frequency driving mode and to output a first flag signal;

a coefficient determiner configured to determine an acceleration coefficient based on the first flag signal;

an accumulator configured to generate the age using an after-compensation image and the acceleration coefficient and to accumulate the age; and a compensator configured to compensate for a before-compensation image using an accumulated age to generate the after-compensation image.

10. The display apparatus of claim 9, wherein the display panel driver further comprises a scaler configured to downscale a grayscale value of input image data to generate the before-compensation image.

11. The display apparatus of claim 9, wherein the display panel driver further comprises a temperature measurer configured to output a temperature map according to positions in the display panel to the accumulator.

12. The display apparatus of claim 1, wherein the display panel driver comprises:

a low frequency mode determiner configured to determine whether the driving mode of the display panel is the low frequency driving mode and to output a first flag signal;

a coefficient determiner configured to determine an acceleration coefficient based on the first flag signal;

an accumulator configured to generate the age using a before-compensation image and the acceleration coefficient and to accumulate the age; and a compensator configured to compensate for the before-compensation image using an accumulated age to generate an after-compensation image.

13. A display apparatus comprising:

a display panel including a plurality of pixels, a gate driver and a data driver; and a display panel driver connected to the gate driver and the data driver, the display panel driver providing a gate control signal to the gate driver and a data control signal to the data driver, wherein the display panel driver determines whether input image data represents a low grayscale image, generates an age using a first grayscale acceleration coefficient if the input image data does not represent the low grayscale image, and generates the age using a second grayscale acceleration coefficient different from the first grayscale acceleration coefficient if the input image data represents the low grayscale image, wherein when all of grayscale values of the input image data are equal to or less than a threshold grayscale value, the input image data is determined as the low grayscale image, and wherein the first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

14. The display apparatus of claim 13, wherein the display panel driver comprises:

a low grayscale value determiner configured to determine whether the input image data represents the low grayscale image and to output a second flag signal;

a coefficient determiner configured to determine an acceleration coefficient based on the second flag signal;

an accumulator configured to generate the age using an after-compensation image and the acceleration coefficient and to accumulate the age; and a compensator configured to compensate for a before-compensation image using an accumulated age to generate the after-compensation image.

15. The display apparatus of claim 13, wherein the display panel driver comprises:

a low grayscale value determiner configured to determine whether the input image data represents the low grayscale image and to output a second flag signal;

a coefficient determiner configured to determine an acceleration coefficient based on the second flag signal;

an accumulator configured to generate the age using a before-compensation image and the acceleration coefficient and to accumulate the age; and a compensator configured to compensate for the before-compensation image using an accumulated age to generate an after-compensation image.

16. The display apparatus of claim 13, wherein the first grayscale acceleration coefficient has a first inclination for grayscale values between 0 and the predetermined reference grayscale value, and wherein the second grayscale acceleration coefficient has a second inclination greater than the first inclination for the grayscale values between 0 and the predetermined reference grayscale value.

17. The display apparatus of claim 13, wherein the second grayscale acceleration coefficient has more fragmented values for a low grayscale region than the first grayscale acceleration coefficient.

18. The display apparatus of claim 13, wherein the first grayscale acceleration coefficient is obtained by $$\text{round}\left(\left(\left(\frac{\text{grayscale value}}{\text{maximum grayscale value}}\right)^{gm}\right)^{lac}\times res\right),$$

and wherein the second grayscale acceleration coefficient is obtained by $$\text{round}\left(\frac{\text{round}\left(\left(\left(\frac{\text{grayscale value}}{\text{maximum grayscale value}}\right)^{gm}\right)lac\times res\times sf\right)}{sf}\right),$$

where round is a function which rounds a value from a first decimal place, gm represents a gamma value, lac represents a luminance acceleration coefficient, res represents a resolution, and sf represents a scale factor.

19. An electronic apparatus comprising:

a display panel including a plurality of pixels, a gate driver and a data driver;

a display panel driver connected to the gate driver and the data driver, the display panel driver providing a gate control signal to the gate driver and a data control signal to the data driver; and a processor providing input image data and an input control signal to the display panel driver, wherein the display panel driver determines whether a driving mode of the display panel is a low frequency driving mode, generates an age using a first grayscale acceleration coefficient if the driving mode of the display panel is not the low frequency driving mode, and generates the age using a second grayscale acceleration coefficient different from the first grayscale acceleration coefficient if the driving mode of the display panel is the low frequency driving mode, and wherein the first grayscale acceleration coefficient has a maximum value when a grayscale of an image is a maximum grayscale value, and the second grayscale acceleration coefficient has a maximum value when a grayscale of the image is equal to or greater than a predetermined reference grayscale value which is lower than the maximum grayscale value.

20. The electronic apparatus of claim 19, wherein the first grayscale acceleration coefficient has a first inclination for grayscale values between 0 and the predetermined reference grayscale value, and wherein the second grayscale acceleration coefficient has a second inclination greater than the first inclination for the grayscale values between 0 and the predetermined reference grayscale value.

* * * * *